J. R. SCOTT.
AUTOMATIC VALVE.
APPLICATION FILED JULY 31, 1913.
1,111,409.
Patented Sept. 22, 1914.
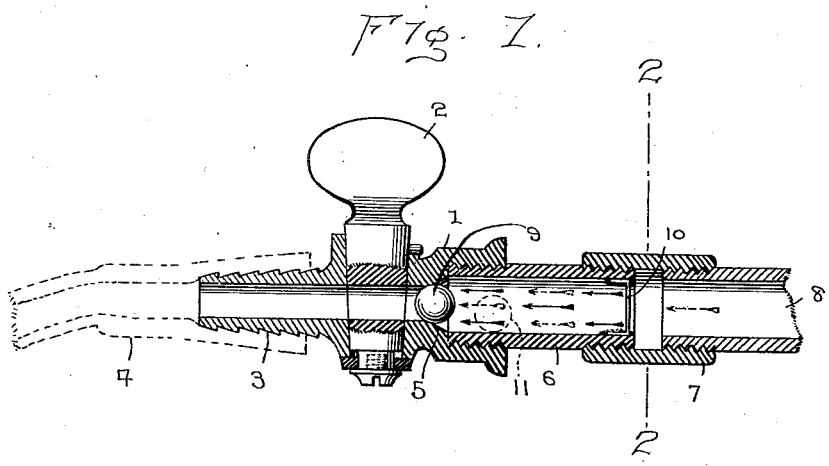
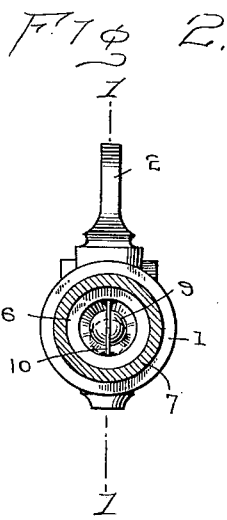
WITNESSES
J. R. Scott
INVENTOR
Attorneys

UNITED STATES PATENT OFFICE.

JOHN R. SCOTT, OF CHARLESTON, WEST VIRGINIA.

AUTOMATIC VALVE.

1,111,409.   Specification of Letters Patent.   Patented Sept. 22, 1914.

Application filed July 31, 1913. Serial No. 782,369.

*To all whom it may concern:*

Be it known that I, JOHN R. SCOTT, a citizen of the United States, residing at Charleston, in the county of Kanawha and State of West Virginia, have invented certain new and useful Improvements in Automatic Valves; and I do hereby declare the following to be a full, clear, and exact description of the invention, such as will enable others skilled in the art to which it appertains to make and use the same.

This invention relates to a gas valve having a safety shut-off device controlled by the flow of gas therethrough.

The invention has for its object to provide a valve adapted for connection with the flexible tube of a portable heating stove or device, and having means for automatically shutting off the flow of gas at the valve should the flexible tube break or become disconnected.

Another object is to provide a valve with an automatic shut-off device controlled by the flow of fluid therethrough, and which will automatically open when the gas is cut off at the valve and remain open as long as the gas flows at a predetermined velocity.

Another object is to generally improve and cheapen the construction of this type of valve, and to provide a device which will be positive in operation.

In the accompanying drawing, Figure 1 represents a longitudinal sectional view through the valve on the line 1—1 of Fig. 2, and, Fig. 2 represents a sectional view on the line 2—2 of Fig. 1.

Referring to the drawing, wherein similar reference numerals indicate correspondence parts throughout the several views, 1 indicates the body of a valve having a manually operable stem 2, and a paripherally corrugated extension 3 adapted for connection with the rubber end of a flexible tube 4. The opposite end of the body 1 is provided with a threaded socket and tapered wall 5.

A horizontally disposed sleeve 6 is secured in the threaded end of the body 1 and to a suitable coupling 7 adapted for connection with the supply pipe 8. The sleeve 6 provides a housing for a ball 9 adapted for engagement against the tapered wall or seat 5 of the body 1, and prevented from disengagement from the sleeve by a retainer 10 consisting of a bar suitably bent at its ends and soldered or otherwise secured within the sleeve.

As shown in full lines in the drawing, the ball 9 is seated against its seat 5 and the flow of gas is substantially cut off. This is the position into which the ball is moved, after the tube 4 becomes broken or disconnected, by the increased velocity of the gas. The valve 2 is subsequently closed and the gas pressure on both sides of the ball quickly equalized by the gas escaping between the seat 5 and ball and into the space betweeen the latter and the valve 2, thus allowing the ball to roll down the inclined bottom of the seat 5 and to assume the approximate position indicated in dotted lines at 11 in Fig. 1.

In ordinary use, the velocity of the gas current is checked by the consuming appliance and the weight of the ball 9 retains it in the position shown in dotted lines at 11.

What I claim as new is;

In combination with a gas valve having a small cylindrical bore, of a nozzle formed integral therewith at one end, an enlarged socket member formed integrally therewith at the opposite end, a rotary valve positioned intermediate said ends, a removable sleeve having a large cylindrical bore and adapted to threadingly engage said socket, a frusto-conical surface connecting said small bore with said large bore, a ball normally contained wholly within said removable sleeve when said rotary valve is open and a normal consumption of gas is taking place, said ball valve being adapted to seat against said frusto-conical surface and wholly within said enlarged socket member when said rotary valve is open but no gas is being consumed, and a retaining rod positioned at the inlet end of said removable sleeve to prevent displacement of the ball in that direction.

In testimony whereof I have signed my name to this specification in the presence of two subscribing witnesses.

JOHN R. SCOTT.

Witnesses:
FRANK R. HURLBUTT,
ROBT. DOUGLAS ROLLER.

---

Copies of this patent may be obtained for five cents each, by addressing the "Commissioner of Patents, Washington, D. C."